Patented Dec. 1, 1925.

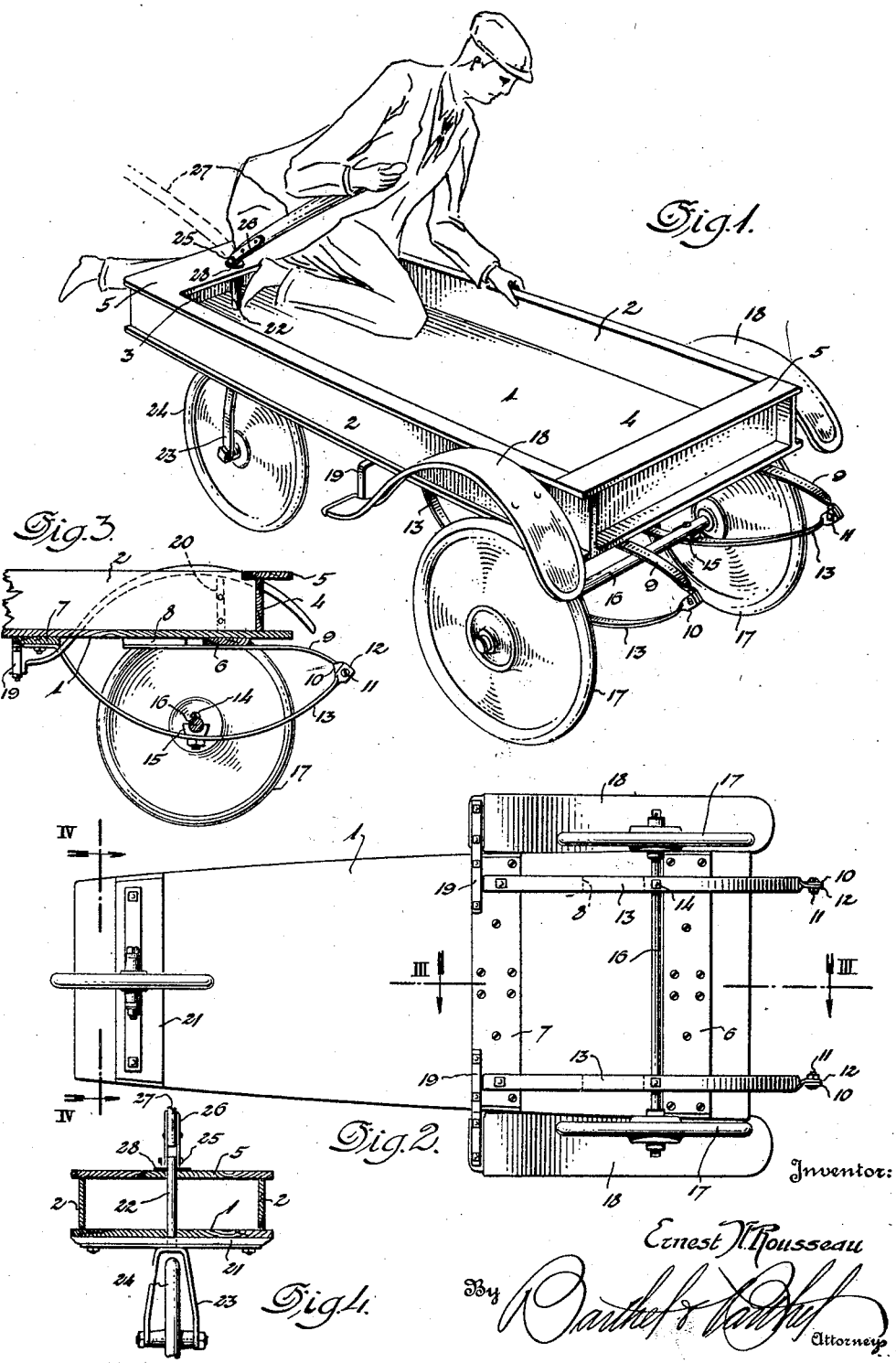

1,563,401

UNITED STATES PATENT OFFICE.

ERNEST N. ROUSSEAU, OF DETROIT, MICHIGAN.

WAGON.

Application filed March 29, 1923. Serial No. 628,456.

*To all whom it may concern:*

Be it known that I, ERNEST N. ROUSSEAU, a citizen of the United States of America, residing at Detroit, in the county of Wayne and State of Michigan, have invented certain new and useful Improvements in Wagons, of which the following is a specification, reference being had therein to the accompanying drawings.

This invention relates to a coaster or scooter wagon and one of the objects of my invention is to provide a three-wheel wagon in which a boy may kneel on one leg and scoot or propel the wagon with the other leg while gripping a side rail of the wagon body with one hand and steering the wagon with the other hand. This can be easily accomplished by a three-wheel wagon, in contradistinction to a four-wheel wagon having steering wheels at each side of the body thereof, for the reason that side wheels interfere with the propelling movement of a leg, are liable to tear the clothes, and interfere with accurate movement of the wagon, whereas with a single steering wheel under the body of the wagon the operator has plenty of room at each side of the wagon body for leg movement and in many instances the operator can swing his body and thus influence the movement of a wagon body for steering purposes.

Another object of this invention is to provide a strong and durable three-wheel wagon with a spring suspension between the front axle and body of the wagon which will insure comparatively smooth riding for an occupant of the wagon body, particularly when the wheels of the wagon body are provided with rubber tires.

Other objects of my invention are to provide a novel steering post and handle for the wagon, and side fenders to prevent the front wheels of the wagon from injuring clothing in proximity thereto.

The above are a few of the objects which may be obtained by the construction to be hereinafter described, and reference will now be had to the drawing, wherein—

Figure 1 is a perspective view of the wagon illustrating one manner of using the same;

Fig. 2 is a bottom plan of the wagon;

Fig. 3 is a longitudinal sectional view taken on the line III—III of Fig. 2, and Fig. 4 is a cross sectional view taken on the line IV—IV of Fig. 2.

The wagon body comprises a bottom board or boards 1 provided with side walls 2 and end walls 3 and 4, all of said walls being provided with rails 5 which not only finish off the upper edges of said walls, but permit of said walls being easily gripped by the hands. The wagon body tapers inwardly from the front end thereof to the rear end so that the rear end of the wagon body may be supported by a single steering wheel in contradistinction to a set of wheels or a steering truck, and with the rear end of the body comparatively narrow the side overhang of the body is reduced to such an extent that there is little, if any, danger of the body being tilted by a weight at either side of the body, for instance a boy kneeling in the rear end of the body, as shown in Fig. 1.

The lower face of the wagon body, at the forward end thereof is provided with transversely disposed cleats 6 and 7 and longitudinally disposed cleats 8. Bolted or otherwise secured to the cleats 6 and 8 are the flat ends of quarter elliptical springs 9 having the front ends thereof terminating in apertured lugs 10 pivotally connected, by nut equipped bolts 11 to springs 13, said springs having the rear ends thereof bolted or otherwise connected to the transverse cleats 7. The springs 13 have intermediate portions thereof connected, by nut equipped bolts 14 or other fastening means to spring perches 15 on the lower side of the front axle 16, said axle having its ends provided with wheels 17.

Supported over the wheels 16 are fenders 18 which have the rear ends thereof bolted or otherwise connected to Z brackets 19 attached to the cleats 7 and projecting from the ends thereof. The front ends of the fenders 18 are supported by angle brackets 20 attached to the side walls 2 of the wagon body.

The lower face of the wagon body, at the rear end thereof, has a transverse cleat 21 and extending upwardly through this cleat, the bottom board or boards 1, and the rear rail 5 is a steering post 22 having its lower end provided with a fork 23 for a rear steering wheel 24. Pivotally connected to the upper end of the steering post 22 by a nut equipped bolt 25 or other pivotal means, are the side straps 26 of a tongue, tiller, or handle 27 which may be swung in a vertical plane relative to the steering post 22, so as to extend forwardly relative to the forward end of the vehicle body.

On the rear rail 5 at the front side of the post 22 is a wear plate 28 which prevents the side straps 26 and the tongue or handle 27 from injuring the rear rail 5 as the tongue or handle is laterally swung for steering purposes.

The tongue or handle 27 is of such a length that it may be used for pulling the wagon or it may be swung over the wagon body so as to be used similar to a tiller for steering the wagon when the same is propelled or used as a scooter. Furthermore, since the single rear steering wheel has the action of a caster the wagon can be swung about in a comparatively small space, for instance a circle having a radius corresponding to the length of the wagon body. Sharp turns can therefore be safely and quickly made and the manipulation of the wagon is made easy compared to a four-wheel vehicle.

In order that a boy kneeling in the rear end of the wagon body may use his skill and the weight of his body to influence the movement of the wagon, the wagon body has been provided with the spring suspension in order that the body may be more or less flexible relative to the front axle, and at the same time insure a degree of comfort to an occupant of the wagon.

The wheels of the wagon are preferably of the disk type provided with solid rubber tires, and anti-frictional bearings for the axles of the wheels, thus providing a strong, durable and high grade wagon that will withstand the rough usage to which such wagons are ordinarily subjected.

One embodiment of my invention has been illustrated, but it is to be understood that the structural elements are susceptible to such variations and modifications as fall within the scope of the appended claim.

What I claim is:—

A scooter wagon comprising a body tapering inwardly from one end thereof to the opposite end of said body, rails on said body, two wheels supporting the wide end of said body, a cleat fixedly secured to the underside of the narrow end of said body, a steering wheel supported fork engaging said cleat, a steering post extending through said cleat, body and one of the rails thereof and supported from said steering wheel fork, and a steering tongue pivotally connected to the upper end of said steering post and swingable laterally and vertically relative to said body and capable of extending over said body so as to be moved by one hand of an operator kneeling on one leg in said body and propelling the wagon with the other leg.

In testimony whereof I affix my signature.

ERNEST N. ROUSSEAU.